US011232094B2

(12) United States Patent
Zdornov et al.

(10) Patent No.: US 11,232,094 B2
(45) Date of Patent: Jan. 25, 2022

(54) TECHNIQUES FOR DETERMINING ANCESTRY IN DIRECTED ACYCLIC GRAPHS

(71) Applicant: Vast Data Ltd., Tel Aviv (IL)

(72) Inventors: Vladimir Zdornov, Kfar Saba (IL); Asaf Levy, Tel Aviv (IL); Asaf Weisman, Kiryat Ono (IL); Avi Goren, Tel Aviv (IL); Renen Hallak, Tenafly, NJ (US)

(73) Assignee: Vast Data Ltd., Tel Aviv (IL)

( * ) Notice: Subject to any disclaimer, the term of this patent is extended or adjusted under 35 U.S.C. 154(b) by 232 days.

(21) Appl. No.: 16/715,490

(22) Filed: Dec. 16, 2019

(65) Prior Publication Data
US 2021/0182273 A1 Jun. 17, 2021

(51) Int. Cl.
*G06F 16/23* (2019.01)
*G06F 16/22* (2019.01)

(52) U.S. Cl.
CPC .......... *G06F 16/2365* (2019.01); *G06F 16/22* (2019.01)

(58) Field of Classification Search
None
See application file for complete search history.

(56) References Cited

U.S. PATENT DOCUMENTS

| 8,527,480 | B1* | 9/2013 | Van Rotterdam | G06F 16/80 707/695 |
| 9,639,352 | B1* | 5/2017 | van Schaik | G06F 8/77 |
| 2014/0351214 | A1* | 11/2014 | Abercrombie | G06F 16/137 707/626 |
| 2015/0127618 | A1* | 5/2015 | Alberti | G06F 8/63 707/678 |
| 2017/0364701 | A1* | 12/2017 | Struttmann | G06F 16/2282 |

* cited by examiner

*Primary Examiner* — Irene Baker
(74) *Attorney, Agent, or Firm* — M&B IP Analysts, LLC

(57) ABSTRACT

A system and method for determining ancestry in directed acyclic graphs (DAGs). The method includes accessing a first node of a plurality of nodes in a DAG to obtain first change time data and ancestry data, wherein the plurality of nodes includes at least one point of interest, wherein the first change time data indicates a time of a first change to ancestry of the closest point of interest (CPOI); accessing a CPOI of the first node to obtain second change time data, wherein the second change time data indicates a time of a most recent change to ancestry of the CPOI; comparing the first change time data with the second change time data; and determining ancestry of the first node, wherein the ancestry of the first node is determined based on the ancestry data when the first change time data matches the second change time data.

25 Claims, 9 Drawing Sheets

TECHNIQUES FOR DETERMINING ANCESTRY IN DIRECTED ACYCLIC GRAPHS

TECHNICAL FIELD

The present disclosure relates generally to directed acyclic graphs (DAGs), and more specifically to determining hierarchical relationships in data.

BACKGROUND

In data storage, determining that a subset of stored data belongs to a particular subtree or other portion of a hierarchy may be useful for purposes such as creating snapshots, quotas, replications, and the like. Accordingly, techniques for effectively determining ancestry are desirable. Existing solutions for determining ancestry include navigating a hierarchy (e.g., a filesystem tree) along all potential paths.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for determining ancestry in directed acyclic graphs (DAGs). The method comprises: accessing a first node of a plurality of nodes in a DAG to obtain first change time data and ancestry data, wherein the plurality of nodes includes at least one point of interest (POI), wherein each POI is one of the plurality of nodes storing data indicating that the node is a POI, wherein the first node stores closest POI (CPOI) data indicating a CPOI for the first node, wherein the CPOI for the first node is one of the at least one POI that requires the fewest visits when traversing upward in the DAG beginning with the first node, wherein the first change time data indicates a time of a first change to ancestry of the CPOI; accessing a second node of the plurality of storage nodes to obtain second change time data, wherein the second node is the CPOI for the first node indicated in the CPOI data, wherein the second change time data indicates a time of a second change to ancestry of the CPOI, wherein the second change is a most recent change to ancestry of the CPOI; comparing the first change time data with the second change time data; and determining ancestry of the first node, wherein the ancestry of the first node is determined based on the ancestry data when the first change time data matches the second change time data.

Certain embodiments disclosed herein also include a non-transitory computer readable medium having stored thereon causing a processing circuitry to execute a process, the process comprising: accessing a first node of a plurality of nodes in a DAG to obtain first change time data and ancestry data, wherein the plurality of nodes includes at least one point of interest (POI), wherein each POI is one of the plurality of nodes storing data indicating that the node is a POI, wherein the first node stores closest POI (CPOI) data indicating a CPOI for the first node, wherein the CPOI for the first node is one of the at least one POI that requires the fewest visits when traversing upward in the DAG beginning with the first node, wherein the first change time data indicates a time of a first change to ancestry of the CPOI; accessing a second node of the plurality of storage nodes to obtain second change time data, wherein the second node is the CPOI for the first node indicated in the CPOI data, wherein the second change time data indicates a time of a second change to ancestry of the CPOI, wherein the second change is a most recent change to ancestry of the CPOI; comparing the first change time data with the second change time data; and determining ancestry of the first node, wherein the ancestry of the first node is determined based on the ancestry data when the first change time data matches the second change time data.

Certain embodiments disclosed herein also include a system for determining ancestry in directed acyclic graphs (DAGs). The system comprises: a processing circuitry; and a memory, the memory containing instructions that, when executed by the processing circuitry, configure the system to: access a first node of a plurality of nodes in a DAG to obtain first change time data and ancestry data, wherein the plurality of nodes includes at least one point of interest (POI), wherein each POI is one of the plurality of nodes storing data indicating that the node is a POI, wherein the first node stores closest POI (CPOI) data indicating a CPOI for the first node, wherein the CPOI for the first node is one of the at least one POI that requires the fewest visits when traversing upward in the DAG beginning with the first node, wherein the first change time data indicates a time of a first change to ancestry of the CPOI; access a second node of the plurality of storage nodes to obtain second change time data, wherein the second node is the CPOI for the first node indicated in the CPOI data, wherein the second change time data indicates a time of a second change to ancestry of the CPOI, wherein the second change is a most recent change to ancestry of the CPOI; compare the first change time data with the second change time data; and determine ancestry of the first node, wherein the ancestry of the first node is determined based on the ancestry data when the first change time data matches the second change time data.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
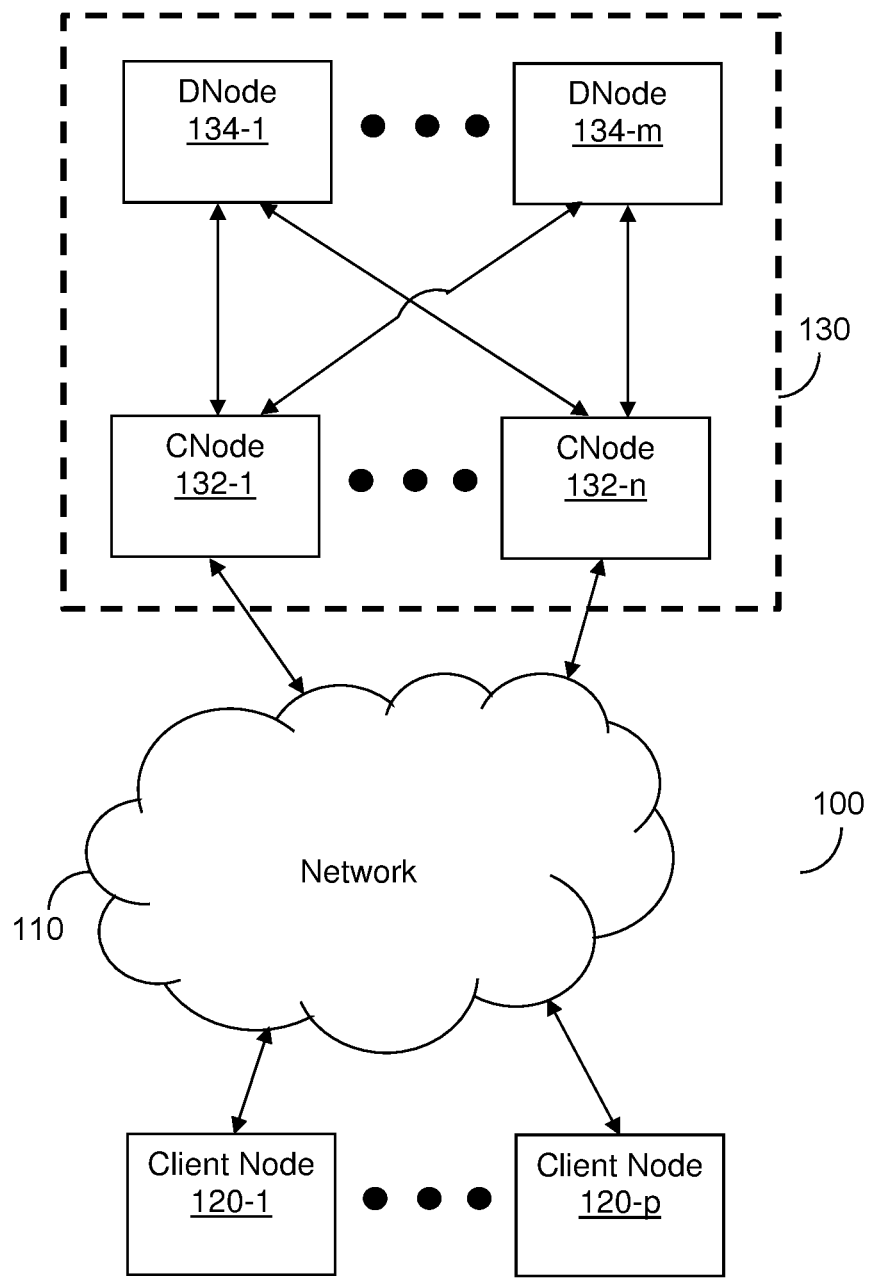
FIG. 1 is a network diagram showing a distributed storage system utilized to describe various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

It has been identified that defining and modifying hierarchies incur performance penalties. More specifically, determining hierarchical relationships among nodes in a directed acyclic graph (DAG) may incur substantial penalties due to multiplicity of paths, movement of nodes, or both. Accordingly, the disclosed embodiments provide techniques for efficiently determining ancestry in DAGs. More specifically, the ancestry may be defined with respect to any given pair of nodes such that ancestry is established between the nodes if navigation from one node to the other by traversing up a hierarchy of nodes is possible. The disclosed embodiments provide techniques for minimizing the amount of navigation required for determining ancestry and, accordingly, for reducing performance penalties associated with such navigation.

One or more nodes among a hierarchy are designated as points of interest. Each node in the hierarchy stores data indicating information related to the closest point of interest in the hierarchy and ancestry data indicating ancestor nodes in the hierarchy. Specifically, the data related to the closest point of interest identifies the closest point of interest and change time data indicating a time of a change made to the closes point of interest. When ancestry needs to be determined for a node, change time data in the node is compared to change time data stored in the node's closest point of interest. If the compared data matches, then the node's ancestry data is validated without requiring traversal of the hierarchy.

Comparing change time as described herein allows for validating ancestry data of a node without requiring traversal of the hierarchy in at least some circumstances. More specifically, traversal is only required if ancestry data is not validated through comparison of change time data between a last known change time of the CPOI stored in the first node and the actual last change time of the CPOI stored in the CPOI.

Additionally, new nodes may be created without requiring traversal of the hierarchy. Specifically, ancestry data may be copied from the new node's parent and the ancestry of the new node may be determined in accordance with the disclosed embodiments when such ancestry is needed. If the change time data stored in the node is no longer accurate as determined via the disclosed comparison, the ancestry data will not be validated and the ancestry data can be updated by traversing the hierarchy. Otherwise, the validated ancestry data is used to determine ancestry without traversal.

The disclosed embodiments further include various techniques for modifying a hierarchy while minimizing traversals. In particular, a new point of interest may be created, a point of interest may be removed, a new node may be created, and one or more nodes may be moved within a hierarchy. Storing ancestry data in accordance with the disclosed embodiments allows for determining ancestry and, in particular, determining ancestry via traversal of the hierarchy, only as needed. Accordingly, the disclosed embodiments provide techniques that allow for defining and modifying hierarchies while reducing penalties on the synchronous path.

The disclosed embodiments also include techniques for validating historical ancestry data using point of interest data. To this end, in an embodiment, each node further stores historical ancestry data indicating historical parents of the node in addition to the ancestry data indicating the current parent. When a node is moved, its historical ancestry data may be updated to indicate the most recent parent as a historical parent and the ancestry data may be updated to indicate the new current parent. Reverse depth-first reversal may be used to traverse the hierarchy starting from the parent of a given node. The ancestry of each parent node, both present and past, is fully resolved. The validation of historical ancestries may be utilized, for example, to deduce a set of relevant snapshots for hierarchies or sub-hierarchies that a node was previously part of.

At least due to the navigation-saving benefits of the validation process described herein, validation of historical ancestry data is also improved. More specifically, the movement of nodes and their ancestors within a hierarchy may create a need for a significantly higher number of traversals in order to resolve historical ancestry data. By validating as described herein, the amount of traversal being performed and, accordingly, the impact of performance penalties due to such traversals, is reduced.

In an embodiment, the hierarchy is a tree including nodes and edges defining relationships between nodes. In other embodiments, the hierarchy may be in other forms such as, but not limited to, a directed acyclic graph (DAG). The nodes are arranged in levels from highest to lowest. The top node in the hierarchy is a root node. Relationships between nodes include parent-child relationships in which a parent node is connected via an edge to a child node such that the parent node is in a higher level within the tree. Any node which does not have any children (i.e., any node which is not a parent sharing an edge to a lower level child node) is a leaf node. A subtree within the tree is a sub-hierarchy including a top node of the subtree and all descendants of the top node. Thus, the top node of the subtree is the ancestor of all other nodes in the subtree.

A second node is an ancestor of a first node if the second node can be discovered by traversing upward in the hierarchy starting at the first node. Traversing through nodes in the hierarchy involves passing through the nodes in a particular order. Traversing upward in the hierarchy involves passing through the nodes in an order such that nodes are discovered from lower to higher levels (i.e., beginning with a node in a lower level and moving upward to nodes in successively higher levels). In various embodiments, the traversal may only include traversing along the mismatching subpath, i.e., a subpath between the first and second nodes, rather than the whole path from the first node to the root node in order to further minimize penalties associated with traversal.

FIG. 1 is an example network diagram 100 illustrating a distributed storage system utilized according to various disclosed embodiments. The network diagram 100 includes a distributed storage compute node 132, a network 110, and client nodes 120-1 through 120-p (referred to as a client node 120 or as client nodes 120 for simplicity).

The distributed storage compute node 132 includes compute nodes 132-1 through 132-n (referred to as a CNode 132 or as CNodes 132 for simplicity) and storage nodes (DNodes) 134-1 through 134-m (referred to as a DNode 134 or as DNodes 134 for simplicity). The distributed storage compute node 132 may be configured as described further in U.S. patent application Ser. No. 16/002,676, assigned to the common assignee, the contents of which are hereby incorporated by reference.

The network 110 may be, but is not limited to, a wireless, cellular or wired network, a local area network (LAN), a wide area network (WAN), a metro area network (MAN), the Internet, the worldwide web (WWW), similar networks, and any combination thereof. The client node 120 may be, but is not limited to, a server, a personal computer, a laptop, a tablet computer, a smartphone, or any other device configured to store data, access data, or both.

The DNodes 134 may be realized as combinations of volatile (e.g., RAM) and non-volatile (e.g., Flash, 3D Xpoint) memories. The non-volatile memories may be included in, for example, hard-disk drives (HDDs), solid state drives (SSDs), or a combination thereof.

The CNodes 132 are configured to translate access commands into formats supported by the DNodes 134. Example protocols supported via translation by the CNodes 132 may include, but are not limited to, Block protocols, Network Attached System protocols [e.g., Network File System (NFS) protocol, Server Message Block (SMB) protocol, etc.], Object Store protocols [e.g., Simple Storage Service (S3) protocol], Key Value Store protocol, and the like. Because the CNodes 132 are configured to translate access commands into a format that is supported by the protocol of the DNodes 134, support for new protocols may be added by configuring the CNodes 132 with translation rules for the new protocols. The translation rules may include rules for converting access commands in a received format into a format that is compatible with the protocol supported by the DNodes 134.

The CNodes 132 collectively act as a distributed transaction manager for accessing data in the DNodes 134. As the CNodes 132 do not store the data to be accessed by client nodes or the metadata used for navigating to locations in the DNodes 134, such data and metadata do not need to be recovered when one or more of the CNodes 132 fails. Additionally, CNodes 132 may be added or removed without disrupting data stored in the storage compute node 132. An example schematic diagram of a CNode 132 is described below with respect to FIG. 4.

The client node 120 is configured to send access commands to the distributed storage compute node 132 via the network 110. The CNodes 132 are configured to receive access commands from the client nodes 120 and to access the DNodes 134 based on the received commands. The access may include translating the received commands into a format supported by the DNodes 134. As shown in FIG. 1, each CNode 132 may access all DNodes 134. As a non-limiting example, NVM Express (NVMe) over Fabrics may be utilized to enable such access.

The access may include navigating an element store distributed across the DNodes 134 to access data in data blocks stored in the DNodes 134. The CNodes 132 are configured to navigate the element store to read the data blocks and to modify the element store by, for example, splitting blocks, merging blocks, and the like. To this end, the CNodes 132 may be configured to allocate new blocks, write data to blocks, read data from blocks, add and remove pointers in blocks, and the like.

Each element may further include an element data store (not shown) allowing for read and write operations of data to the element. Whether the element includes an element data store may depend on the type of the element. As a non-limiting example, a file may have an element data store. The element data store may be thinly provisioned with byte granularity such that the number of bytes written to the element data store is the number of bytes used.

At least a portion of the data blocks may be temporarily included in the elements and stored in, for example, 3D Xpoint memory of the DNodes 134 before being migrated from the 3D Xpoint memory to Flash memory of the DNodes 134. When the data is migrated to the Flash memory, the pointers of the elements which had stored the migrated data may be updated to point to the location of the migrated data in the Flash memory. The temporary storage of the data blocks allows for manipulating the data blocks (e.g., via encoding, data reduction, etc.) in the 3D Xpoint memory before migrating the data blocks to the Flash memory.

In an embodiment, the CNodes 132 are configured to determine ancestry in directed acyclic graphs (DAGs) as described herein. More specifically, in an example implementation, elements in the elements store of the DNodes 134 are represented as nodes in a hierarchy. The disclosed embodiments may therefore be utilized to efficiently determine which nodes are ancestors of any given node within the hierarchy.

To this end, in an embodiment, one or more nodes (e.g., nodes representing elements of the element tree) are pre-designated as points of interest (POIs). Each POI is a node storing data indicating that the node is a POI. In a non-limiting example implementation, the POIs may include nodes that each represent the top of a directory within a filesystem, i.e., the top nodes of respective sub-hierarchies. In other implementations, the POIs may be arbitrarily designated.

In an embodiment, the hierarchy is represented as a tree where nodes below the top level of the hierarchy point to respective parent nodes. Each node stores data relates to its closest point of interest (CPOI) in the hierarchy. The CPOI for a node is the closest ancestor within the hierarchy that is also a POI. Which node is the closest ancestor may be based on the number of nodes in the hierarchy that would need to be traversed to arrive at the POI when traversing upward through the hierarchy such that the CPOI for a node is a POI ancestor of the node that requires visiting fewer nodes than all other POI ancestors of the node.

It should be noted that FIG. 1 is merely an example, and that the disclosed embodiments are not limited to application in the particular distributed storage compute node 132. The disclosed embodiments are generally applicable to storage systems using DAGs and may be applied to storage systems having different configurations than that shown in FIG. 1. The disclosed embodiments may further be used in systems requiring hierarchies (e.g., DAGs) other than storage systems without departing from the scope of the disclosure.

Figure 2:
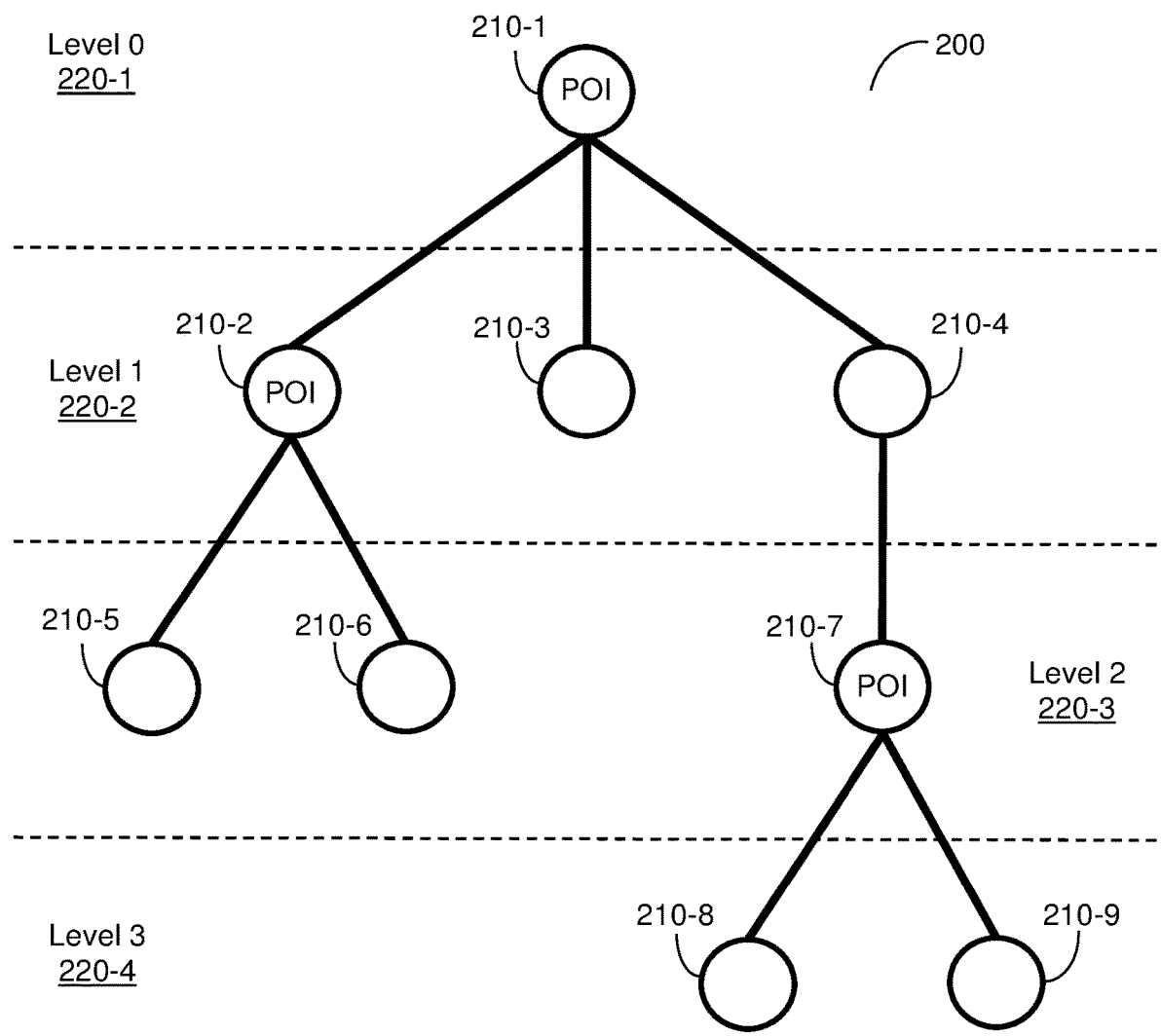
FIG. 2 is a tree diagram illustrating a tree representing a directed acyclic graph utilized to describe various disclosed embodiments.

FIG. 2 is an example tree diagram 200 illustrating a tree representing a DAG utilized to describe various disclosed embodiments.

In the tree diagram 200, nodes 210-1 through 210-9 form a hierarchy including levels 220-1 through 220-4. In the example shown in FIG. 2, nodes 210-1, 210-2, and 210-7 have been designated as points of interest (visually represented via the letters "POI" in each of the designated nodes for illustrative purposes only). The level 220-1 includes the node 210-1, the level 220-2 includes the nodes 210-2 through 210-4, the level 220-3 includes the nodes 210-5 through 210-7, and the level 220-4 includes the nodes 210-8 and 210-9.

As shown in FIG. 2, the node 210-1 is the top node of the hierarchy and, thus, is the root node for the hierarchy. The level 220-1 ("level 0") is the highest (top) level in the hierarchy and the level 220-4 ("level 3") is the lowest level in the hierarchy. The node 210-2 is the parent of the nodes 210-5 and 210-6, the node 210-4 is the parent of the node 210-7, and the node 210-7 is the parent of the nodes 210-8 and 210-9.

As noted above, in an embodiment, each node 210 stores data indicating its CPOI, i.e., the closest ancestor node that is a POI for that node 210. When the hierarchy is arranged as shown in FIG. 2, each of the nodes 210-2 through 210-4 and 210-7 stores data indicating that the node 210-1 is its CPOI, each of the nodes 210-5 and 210-6 stores data indicating that the node 210-2 is its CPOI, and each of the nodes 210-8 and 210-9 stores data indicating that the node 210-7 is its CPOI.

Determining ancestry, in accordance with the disclosed embodiments, involves comparing first change time data stored in a node (i.e., data indicating the most recent time of change known to the node) with second change time data stored in its CPOI (i.e., data indicating the actual most recent time of change). Thus, as an example, validating the ancestry of the node 210-7 would include comparing change time data stored in the node 210-7 with change time data in the node 210-1. If the ancestry is validated, the ancestry data stored in the node 210-7 is determined to be accurate without requiring traversal from the node 210-7 through the node 210-4 and to the node 210-1.

In a further embodiment, the validation includes accessing the CPOI directly. As a non-limiting example, such direct access may include using random access based on a known handle and pointer for the CPOI. This is performed instead of traversing upward to the CPOI. In the example mentioned above, this means that no traversal is needed to obtain the ancestry data from the node 210-1.

Figure 3:
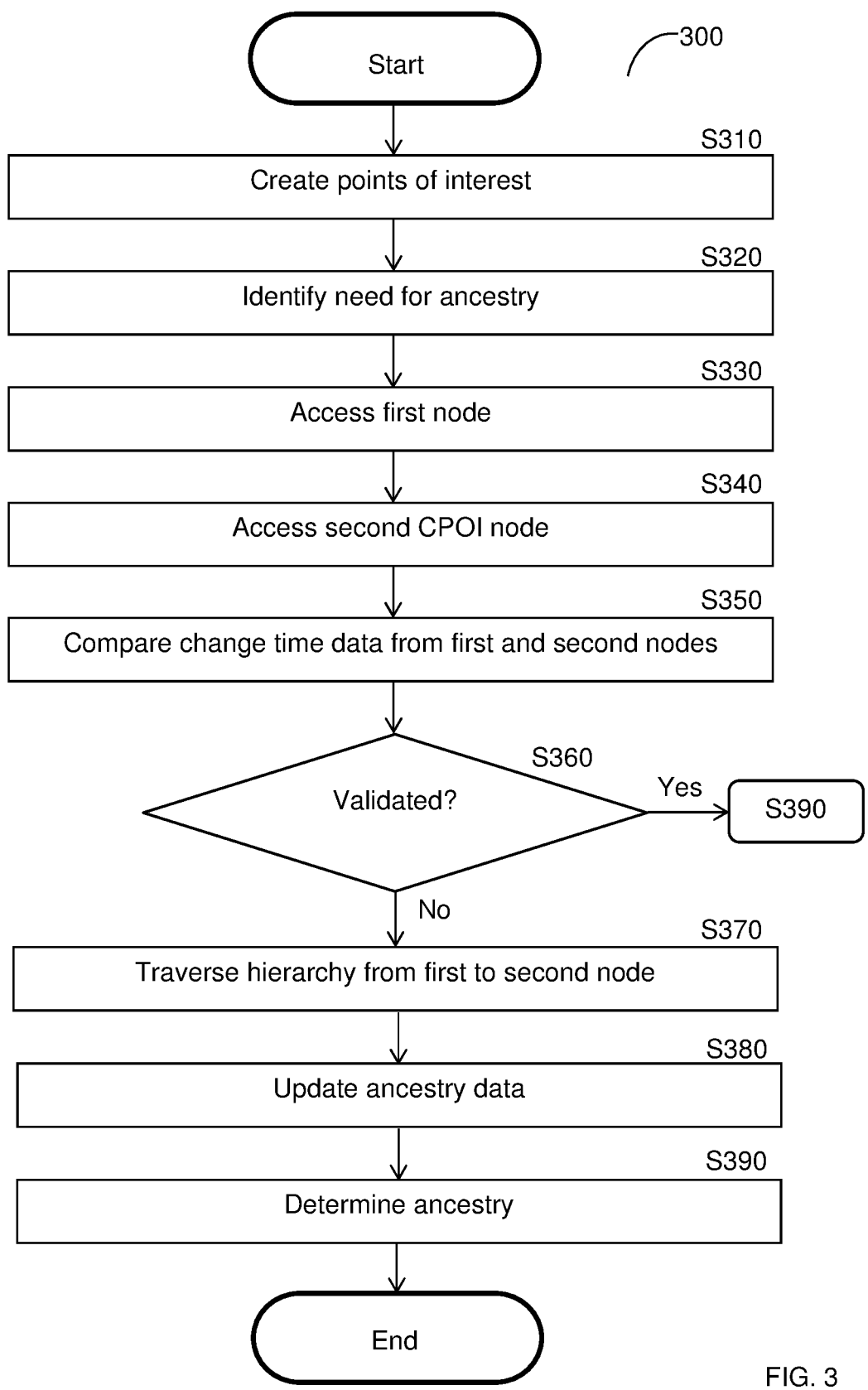
FIG. 3 is a flowchart illustrating a method for determining ancestry according to an embodiment.

FIG. 3 is an example flowchart 300 illustrating a method for determining ancestry according to an embodiment. In an embodiment, the method is performed by one of the CNodes 132, FIG. 1.

At S310, one or more points of interest are created in a DAG. Creating a point of interest includes adding a point of interest designation to data stored in one or more nodes that will become the points of interest and triggering ancestry determinations in other nodes of the same sub-hierarchy as each created point of interest. An example method for creating a new point of interest is shown in FIG. 4.

Figure 4:
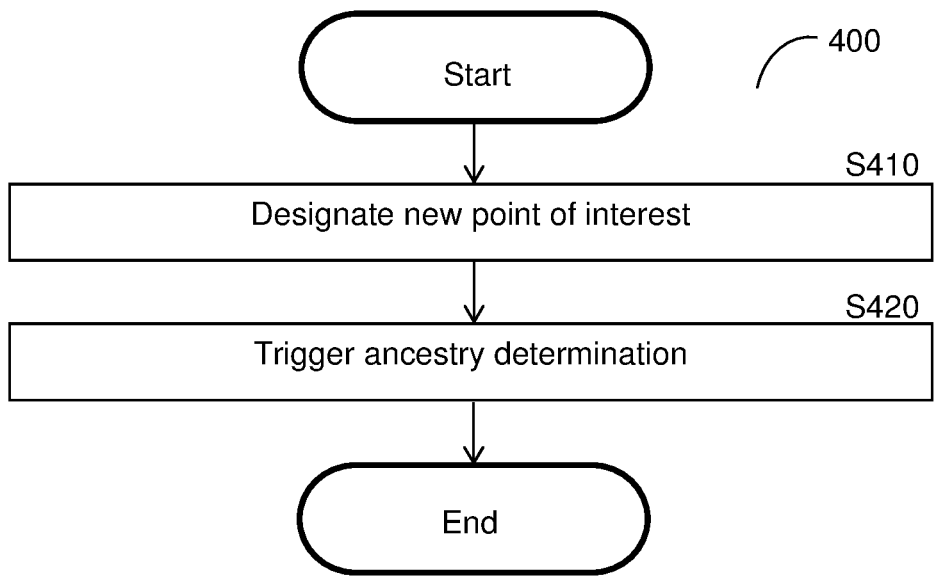
FIG. 4 is a flowchart illustrating a method for creating a new point of interest according to an embodiment.

FIG. 4 is a flowchart 400 illustrating a method for creating a new point of interest according to an embodiment.

At S410, a new point of interest is designated. Designating a new point of interest includes adding data indicating that a node is a point of interest to the node. When ancestry needs to be determined by traversing the hierarchy, the determining entity (e.g., one of the CNodes 132) will discover the point of interest designation and can update other nodes with data indicating the new point of interest. For example, all nodes for which the new point of interest is a CPOI as described above may be updated accordingly.

At S420, ancestry determinations are triggered with respect to one or more other nodes. As a non-limiting example, ancestry determinations may be triggered for each of the nodes in the same sub-hierarchy as the new point of interest. As noted above, these determinations result in discovery of the new point of interest and, therefore, prompt updates regarding the new point of interest to one or more nodes.

Returning to FIG. 3, at S320, when points of interest have been created, a need for determining ancestry for a first node is identified. The need for ancestry may be, for example but not limited to, taking a snapshot, determining a quote, replicating data, and the like. It should be noted that the need for ancestry may be identified at a remote time from the creation of the points of interest such that ancestry is only determined as needed.

At S330, the first node is accessed to obtain ancestry data for the first node and first change time data for a closest point of interest (CPOI) of the first node. The first change time data indicates a most recent known (i.e., known to the first node) time of change to the CPOI. In an embodiment, S330 also includes obtaining CPOI data identifying the CPOI for the first node. The CPOI data may include, for example but not limited to, a handle and pointer of the CPOI.

At S340, a second node that is the CPOI for the first node is accessed to obtain second change time data. The second change time data indicates an actual most recent time of change to the CPOI. In an embodiment, the second node is directly accessed, e.g., via random access. As noted above, the CPOI for a node is the closest ancestor to the node that is also a POI.

At S350, the first change time data obtained is compared to the second change time data in order to determine whether the first and second change time data match.

At S360, based on the comparison, it is determined whether the first ancestry data is validated and, if not, execution continues with S370; otherwise, execution continues with S390. The first change time data is validated when the first change time data matches the second change time data, i.e., such that the most recent time of change of the CPOI known to the first node is the same as the actual most recent time of change of the CPOI.

At S370, when it is determined that the first ancestry data is not validated, a portion of the hierarchy is traversed from the first node to the second node until a point of interest is reached. Such traversal includes passing through the nodes in a particular order starting with the first node and ending with the first point of interest that is encountered. The order is based on the arrangement of the hierarchy. An example traversal is described further above with respect to FIG. 2.

At S380, the first ancestry data is updated based on a point of interest discovered during the traversal. In an embodiment, S380 may further include updating the ancestry of other nodes belonging to the same sub-hierarchy as the first node (e.g., a sub-hierarchy with the second node at the top) to include the newly discovered point of interest.

At S390, the ancestry of the first node is determined. In an embodiment, S390 includes reading the first ancestry data from the first node. As noted above, when the first ancestry data has not been validated, the first ancestry data is updated based on traversal through a portion of the hierarchy prior to the determination. When the first ancestry data is validated, however, no traversal is needed and the first ancestry data is not updated before reading.

Figure 5:
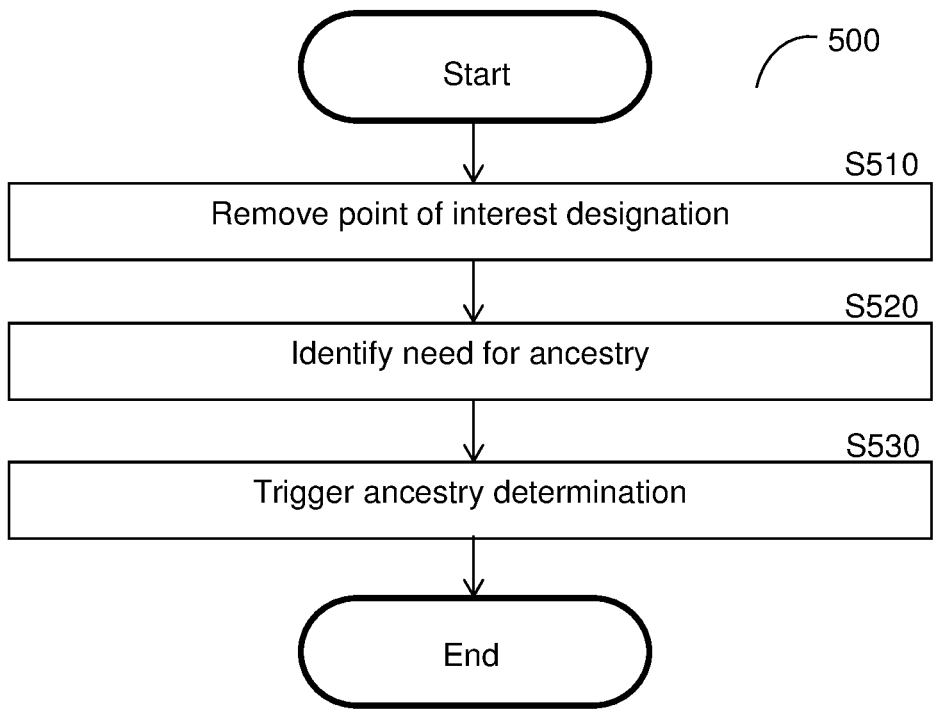
FIG. 5 is a flowchart illustrating a method for removing a point of interest according to an embodiment.

FIG. 5 is a flowchart 500 illustrating a method for removing a point of interest according to an embodiment.

At S510, a point of interest designation is removed from a node currently indicated as a point of interest. The removal may include, but is not limited to, deleting the data indicating that the node is a point of interest. The removal further includes updating a change time indicating the most recent change in the former point of interest.

At S520, when the point of interest designation has been removed, a need for determining ancestry of one or more other nodes is identified. The need for ancestry may be, for example but not limited to, taking a snapshot, determining a quote, replicating data, and the like. It should be noted that the needs for ancestry may occur in parallel or at different times as needed for each node.

At S530, ancestry determinations are triggered for the nodes needing ancestry. Any nodes for which the ancestry includes the removed point of interest will fail validation since the change time in the former point of interest has been updated, thereby requiring traversal which will result in updating the ancestry data. For nodes unaffected by the change, no traversal will be needed as a result of the change.

Figure 6:
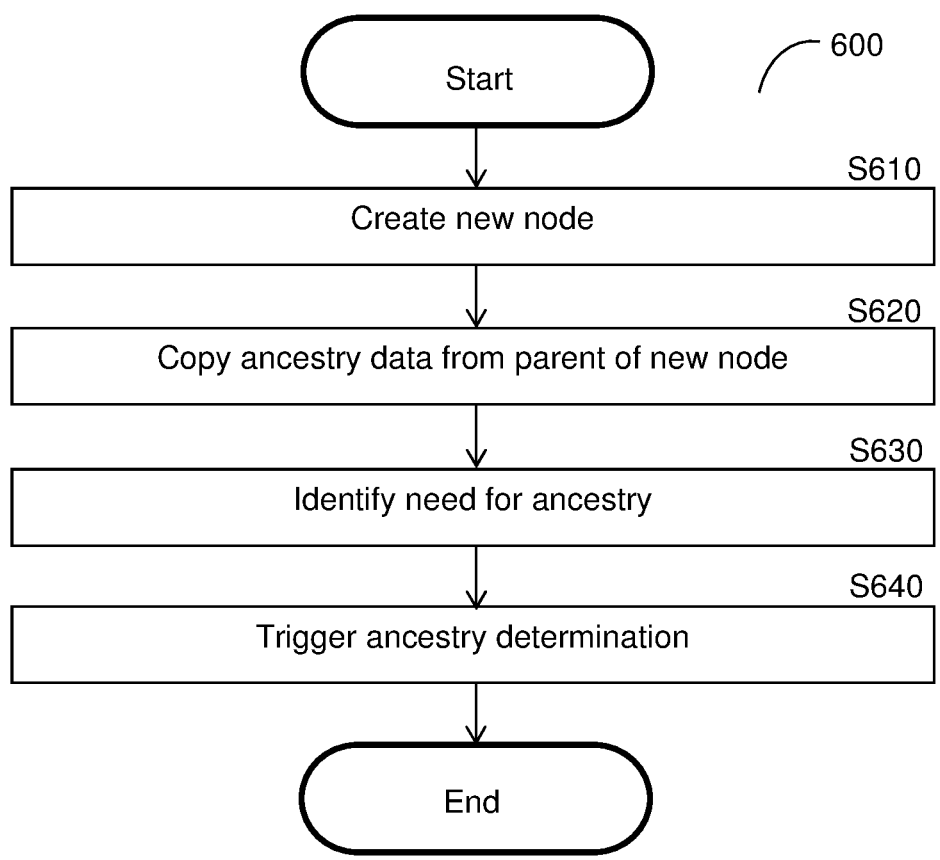
FIG. 6 is a flowchart illustrating a method for creating a new node according to an embodiment.

FIG. 6 is a flowchart 600 illustrating a method for creating a new node according to an embodiment.

At S610, a new node is created. Creating the new node may include, but is not limited to, creating a new data structure, assigning a position of a node representing the new data structure within the hierarchy, and the like.

At S620, ancestry data is copied from the parent of the new node into the new node. Accordingly, the new node effectively stores the ancestry data of its parent when it is created. In an embodiment, S620 further includes copying CPOI data indicating the CPOI of the parent (since that CPOI would also be the CPOI for the new node) as well as change time data indicating the most recent time of change of that CPOI known to the parent.

At S630, when the new node has been created and ancestry data has been copied from its parent node, a need for determining ancestry of the new node is identified.

At S640, an ancestry determination is triggered for the new node. If the parent's change time data for the CPOI is still accurate as compared to the change time data stored in the CPOI when the ancestry determination is performed, the ancestry will remain the same. Otherwise, the new node's ancestry data will be updated based on traversal of a portion of the hierarchy.

Figure 7:
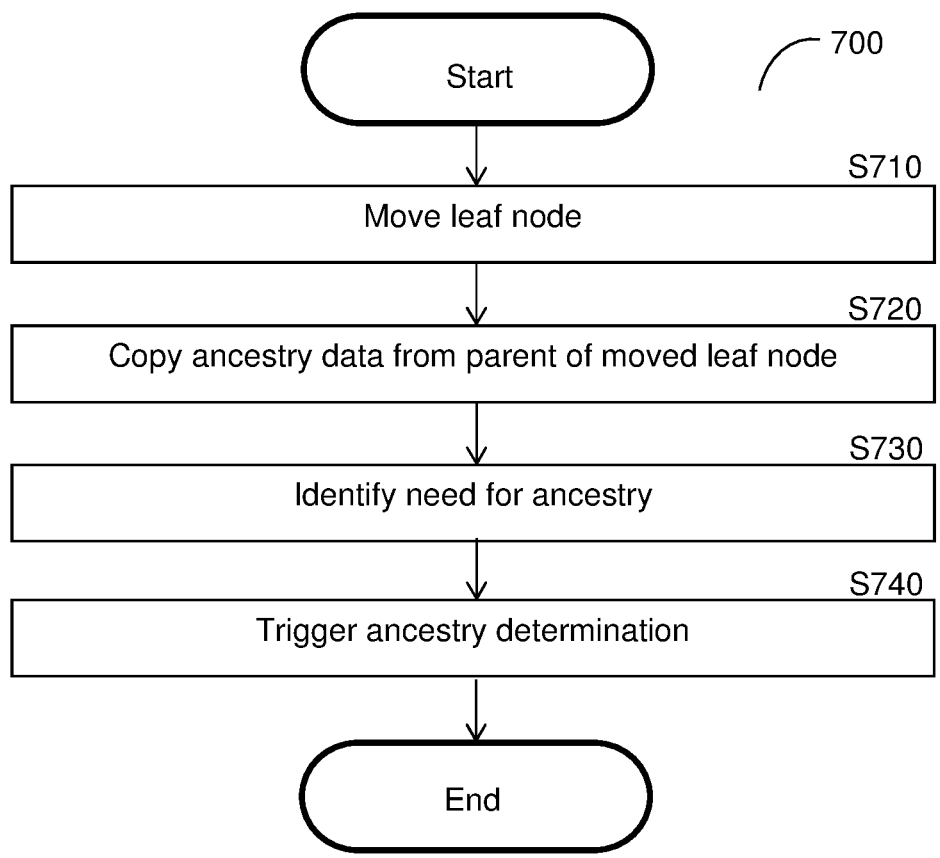
FIG. 7 is a flowchart illustrating a method for moving a leaf node according to an embodiment.

FIG. 7 is a flowchart 700 illustrating a method for moving a leaf node according to an embodiment.

At S710, a leaf node is moved within the hierarchy. The leaf node is a node which has no children, i.e., is not a parent to any other node.

At S720, ancestry data is copied from the parent of the moved node into the moved node. Accordingly, the moved node effectively stores the ancestry data of its parent when it has been moved. In an embodiment, S720 further includes copying CPOI data indicating the CPOI of the parent as well as change time data indicating the most recent time of change of that CPOI known to the parent.

At S730, when the node has been moved and ancestry data has been copied from its parent node, a need for determining ancestry of the moved node is identified.

At S740, an ancestry determination is triggered for the moved node. If the parent's change time data for the CPOI is still accurate as compared to the change time data stored in the CPOI when the ancestry determination is performed, the ancestry will remain the same. Otherwise, the moved node's ancestry data will be updated based on traversal of a portion of the hierarchy.

Figure 8:
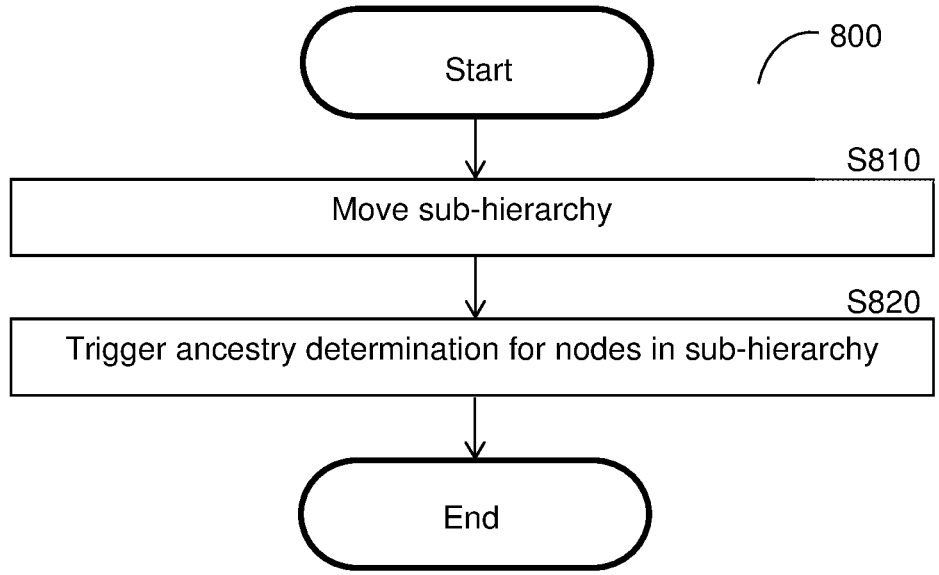
FIG. 8 is a flowchart illustrating a method for moving a sub-hierarchy according to an embodiment.

FIG. 8 is a flowchart 800 illustrating a method for moving a sub-hierarchy according to an embodiment.

At S810, a sub-hierarchy is moved within the hierarchy. The sub-hierarchy includes a top node and one or more lower nodes including one or more children of the top node. The sub-hierarchy is moved from a source portion of the hierarchy to a destination portion of the hierarchy.

At S820, ancestry determination is triggered for nodes in the hierarchy. In an embodiment, the ancestry determination is triggered for nodes in the source portion of the hierarchy such that only other nodes from the source portion of the hierarchy are updated. Typically, the ancestry determination will result in a failed validation, thereby causing traversal through the hierarchy and updating of the nodes in the sub-hierarchy.

Figure 9:
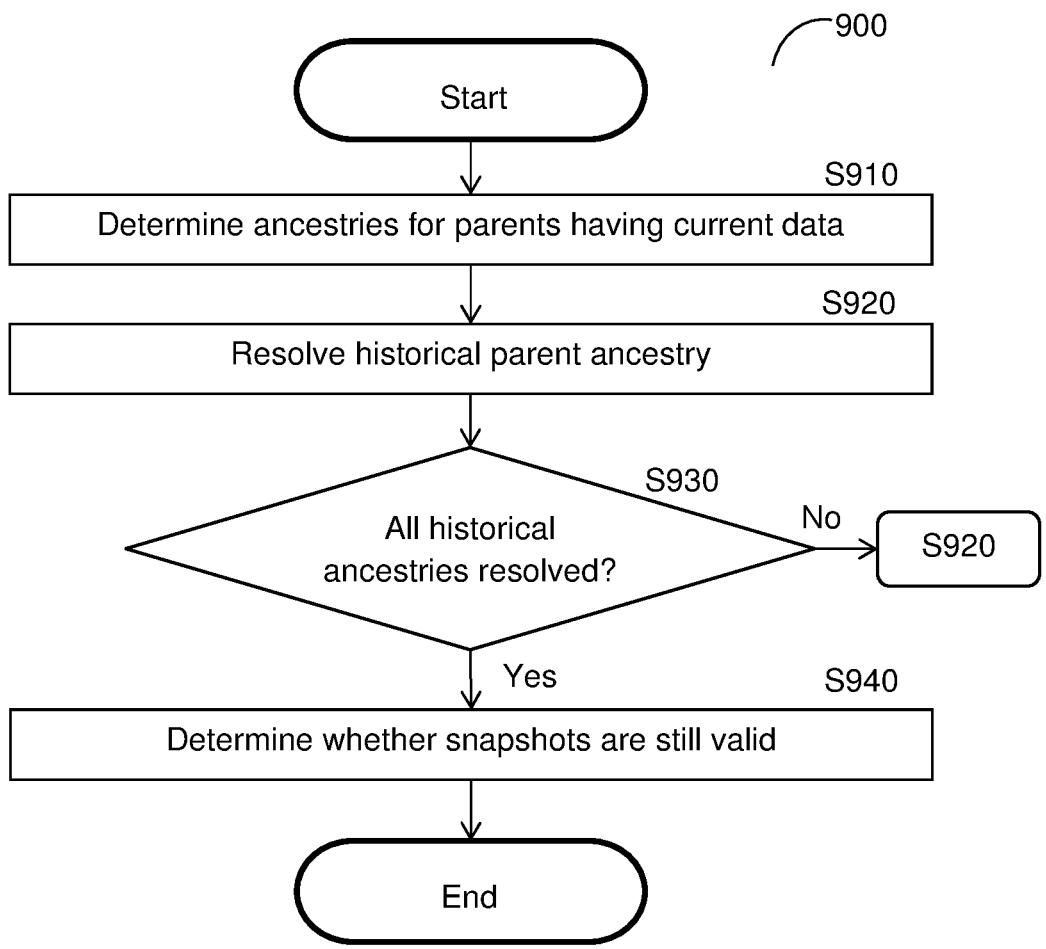
FIG. 9 is a flowchart illustrating a method for resolving historical ancestry according to an embodiment.

FIG. 9 is a flowchart 900 illustrating a method for resolving historical ancestry for a node according to an embodiment. In an embodiment, the method is performed by one of the CNodes 132, FIG. 1.

In an embodiment, each node in a hierarchy stores historical CPOI data and POI history data for the node.

The historical CPOI data for each node may include, but is not limited to, an identifier of at least one historical CPOI as well as a join time for each historical CPOI. The historical CPOI data for each node may further include historical CPOIs and join times for a CPOI for the node (i.e., historical CPOIs of the node's CPOI and their respective join times). Each historical CPOI is a current or previous CPOI for the node. The join time indicates a time at which the historical CPOI became a CPOI for the node.

The historical CPOI data is previously resolved, i.e., is based on a previous validation or traversal. For the most recent known CPOI (i.e., the CPOI having the highest join time), the historical CPOI data may further include a validation timestamp indicating a time at which the ancestry of that historical CPOI was validated.

The POI history data for a node indicates each period of time in which the node was designated as a POI (i.e., time periods in which the node stored data indicating that the node is currently a POI). When a node has never been a POI, the POI history data may be a null value or otherwise indicate that the node has not been a POI. The POI history data may be utilized when traversing the hierarchy in order to determine whether, at each node encountered during the traversal, the traversal should stop at that node since it is the closest historical POI even if the encountered node is not currently a POI.

At S910, ancestries for parents (past, present, or both) of the node having ancestry data for a relevant time period are determined. The relevant time period for a past or present parent is the time period in which the parent was a parent of the node in question. In an embodiment, such ancestries may be determined through validation as described above. A parent has the ancestry data for the relevant time period when a validation timestamp of the historical CPOI data for the node is within the relevant time period. As a non-limiting example, if a parent was previously a parent of the node from time t=1 to time t=5, the parent has the most recent ancestry data for the relevant time period if one of the validation timestamps in historical CPOI data for the node is t=2.

At S920, historical ancestry for a historical parent that did not have most recent ancestry data is resolved. In an embodiment, S920 includes executing a reverse depth-first traversal search in order to resolve the historical ancestry. The historical ancestry is fully resolved among all paths from the historical parent. In some embodiments, if historical ancestry has been previously resolved for the historical parent (e.g., an ancestry determination has been performed for another node that previously shared the parent), then the previously resolved ancestry is used. In an embodiment, historical ancestry of historical parents discovered during the resolution is aggregated.

In an embodiment, the reverse depth-first traversal includes checking the POI history data in each node encountered during the traversal. Based on the check, it is determined whether the node was a POI during the relevant time period for purposes of ancestry determination. As a result, the POI history data is used to ensure that a historical POI for the relevant time period is not skipped for purposes of resolving ancestry when it has since lost its POI designation.

At S930, it is determined if ancestries have been resolved for all parent nodes (past and present) and, if so, execution continues with S940; otherwise, execution continues with S920 for additional instances of reverse breadth-first traversal for additional historical parents.

At S940, based on the ancestries of the past and present parents, it is determined whether a snapshot is valid for the node. The snapshot is determined valid for the node when the respective ancestries related to the node match the snapshot. In an embodiment, a snapshot is defined with respect to POIs of the hierarchy and is associated with a logical time indicated by its timestamp. Thus, in a further embodiment, a snapshot defined with respect to a POI may be determined to be valid or invalid based on a node that has the POI as its CPOI. More specifically, ancestry of the parents of the node are resolved, and the snapshot is validated based on the resolved ancestries.

In an example implementation, the determination of snapshot validity may be used to determine whether the snapshot should be deleted. For example, during garbage collection, invalid snapshots may be deleted.

An example snapshotting method that may be utilized in accordance with the disclosed embodiments is described in U.S. patent application Ser. No. 16/241,124 filed on Jan. 7, 2019, assigned to the common assignee, the contents of which are hereby incorporated by reference. Specifically, in an example implementation, each snapshot may be defined with respect to a point of interest as described herein and is associated with a timestamp used to mark times along a snapline.

Figure 10:
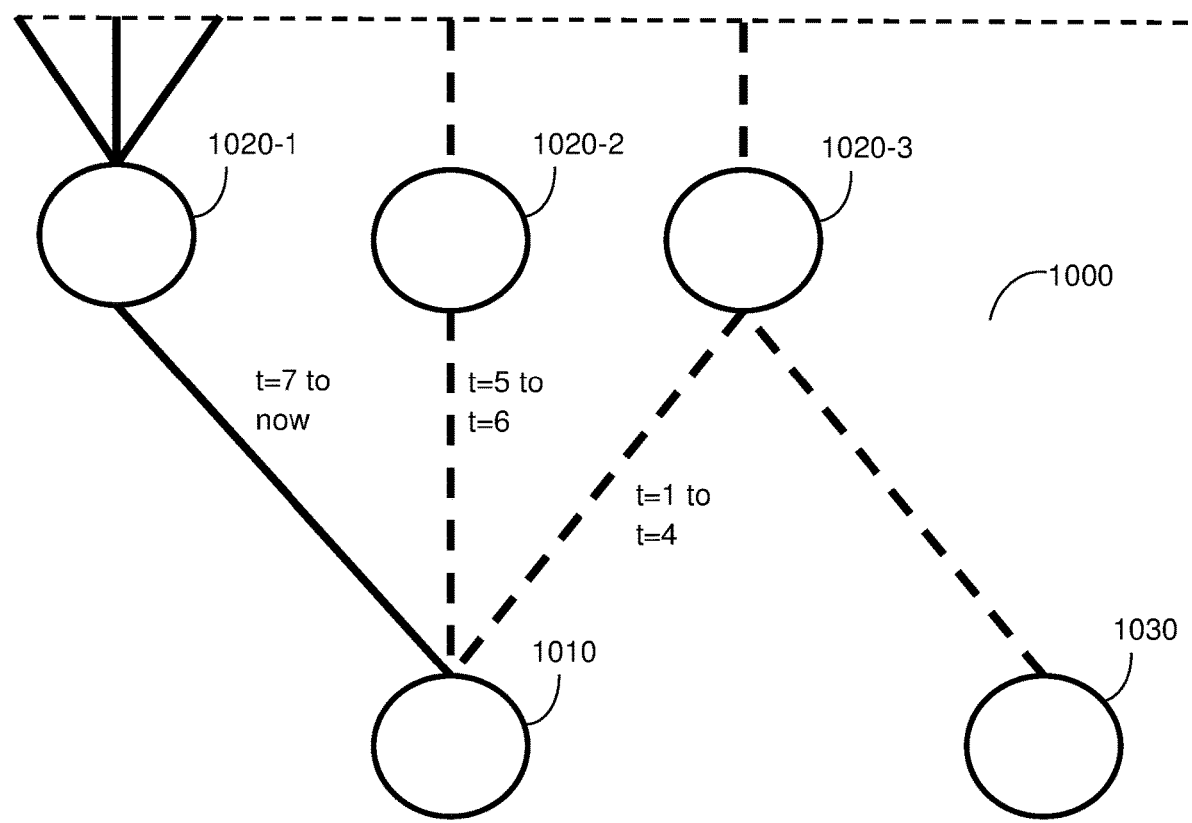
FIG. 10 is an illustration utilized to describe determining historical ancestry according to various disclosed embodiments.

FIG. 10 is an example illustration 1000 utilized to describe determining historical ancestry according to various disclosed embodiments.

The illustration 1000 shows nodes 1010, 102-1 through 1020-3, and 1030. The node 1010 is a node for which historical ancestry data is to be determined. Each of the nodes 1010-1 through 1020-3 is a parent of the node 1010 at some point in time (either present or past). In FIG. 10, the node 1020-1 is the current parent of the node 1010 and has been from time t=7 through the current time. The nodes 1020-2 and 1020-3 are historical parents, i.e., they were previously parents of the node 1010 within the hierarchy at times t=1 through t=5 and t=5 through t=7, respectively. The node 1030 is a former sibling of the node 1010, i.e., they had previously shared a parent (the node 1020-3).

Figure 11:
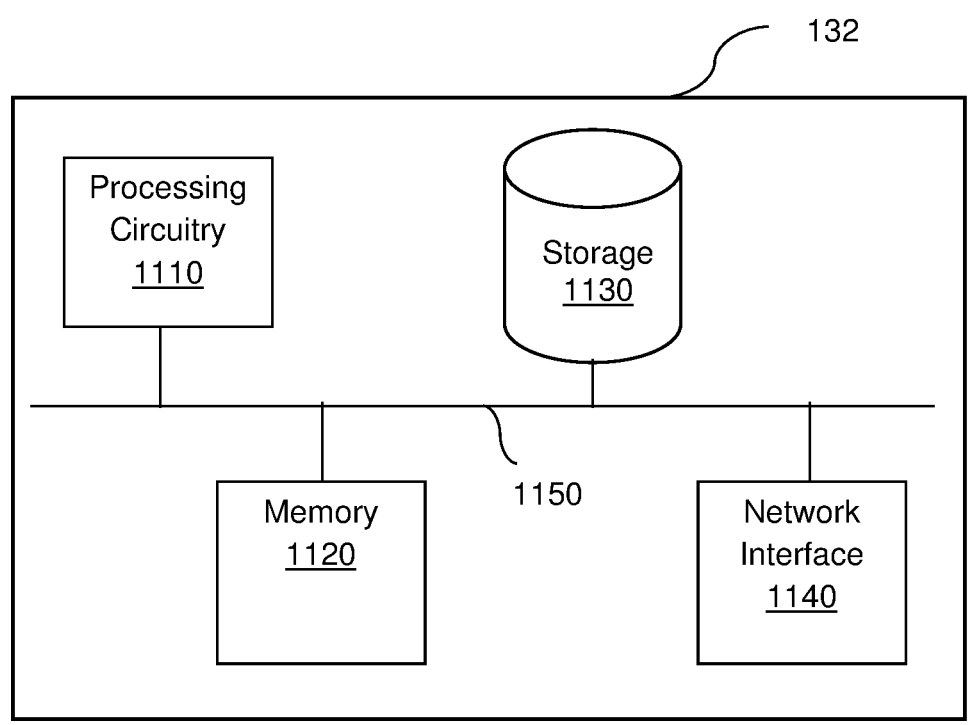
FIG. 11 is a schematic diagram of a compute node according to an embodiment.

FIG. 11 is an example schematic diagram of a compute node 132 according to an embodiment. The compute node 132 includes a processing circuitry 1110 coupled to a memory 1120, a storage 1130, and a network interface 1140.

In an embodiment, the components of the compute node 132 may be communicatively connected via a bus 1150.

The processing circuitry 1110 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 1120 may be volatile (e.g., RAM, etc.), non-volatile (e.g., ROM, flash memory, etc.), or a combination thereof.

In one configuration, software for implementing one or more embodiments disclosed herein may be stored in the storage 1130. In another configuration, the memory 1120 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 1110, cause the processing circuitry 1110 to perform the various processes described herein.

The storage 1130 may be magnetic storage, optical storage, and the like, and may be realized, for example, as flash memory or other memory technology, CD-ROM, Digital Versatile Disks (DVDs), or any other medium which can be used to store the desired information.

The network interface 1140 allows the compute node 132 to communicate with the storage nodes 134 for the purpose of, for example, sending access commands, receiving data, and the like. Further, the network interface 1140 allows the compute node 132 to communicate with the client nodes 120 for the purpose of receiving data requests, sending data received from the storage nodes 134, and the like.

It should be understood that the embodiments described herein are not limited to the specific architecture illustrated in FIG. 11, and other architectures may be equally used without departing from the scope of the disclosed embodiments.

It should be noted that various embodiments are described with respect to a tree, but the disclosed embodiments may be applied to other hierarchies without departing from the scope of the disclosure.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for determining ancestry in directed acyclic graphs (DAGs), comprising:
    accessing a first node of a plurality of nodes in a DAG to obtain first change time data and ancestry data, wherein the plurality of nodes includes at least one point of interest (POI), wherein each POI is one of the plurality of nodes storing data indicating that the node is a POI, wherein the first node stores closest POI (CPOI) data indicating a CPOI for the first node, wherein the CPOI for the first node is one of the at least one POI that requires the fewest visits when traversing upward in the DAG beginning with the first node, wherein the first change time data indicates a time of a first change to ancestry of the CPOI;
    accessing a second node of the plurality of storage nodes to obtain second change time data, wherein the second node is the CPOI for the first node indicated in the CPOI data, wherein the second change time data indicates a time of a second change to ancestry of the CPOI, wherein the second change is a most recent change to ancestry of the CPOI;
    comparing the first change time data with the second change time data; and
    determining ancestry of the first node, wherein the ancestry of the first node is determined based on the ancestry data when the first change time data matches the second change time data.

2. The method of claim 1, wherein determining ancestry of the first node further comprises:
    traversing at least a portion of the DAG when the first change time data does not match the second change time data, wherein the ancestry of the first node is determined based on the traversal when the first ancestry data does not match at least a portion of the second ancestry data.

3. The method of claim 2, wherein the traversal of the at least a portion of the DAG begins at the first node and ends at a third node of the plurality of nodes, wherein the third node is a point of interest.

4. The method of claim 3, wherein the third node is the first POI visited during the traversal of the at least a portion of the DAG, further comprising:
    updating the CPOI data stored in the first node to indicate that the third node is the CPOI.

5. The method of claim 1, wherein the second node is accessed without traversing the DAG.

6. The method of claim 1, wherein the plurality of nodes includes a fourth node, further comprising:
    creating the first node as a new node in the DAG such that the fourth node is a parent of the first node, wherein the ancestry data in the first node is copied from the fourth node.

7. The method of claim 1, wherein the first node and the second node are included in a sub-hierarchy of the DAG, further comprising:
    designating a fifth node among the sub-hierarchy as a new point of interest, wherein the ancestry of the first node is determined when the fifth node has been designated as a new point of interest.

8. The method of claim 1, wherein the plurality of nodes includes a sixth node, wherein the first node is a leaf node, further comprising:
    moving the first node within the DAG such that the sixth node is a parent of the first node, wherein the ancestry data in the first node is copied from the sixth node.

9. The method of claim 1, wherein the first node is not included in a sub-hierarchy of the DAG, further comprising:
    moving the sub-hierarchy, wherein the ancestry of the first node is determined when the sub-hierarchy has been moved.

10. The method of claim 1, wherein each of the plurality of nodes stores historical CPOI data indicating a plurality of historical CPOIs of the node and a join time for each first historical CPOI, wherein the plurality of historical CPOIs includes a most recent CPOI for the first node, further comprising:
    determining, based on the historical CPOI data stored in the first node, whether a snapshot is valid for the first node.

11. The method of claim 10, further comprising:
    resolving an ancestry of each of the plurality of CPOIs by executing a reverse depth-first traversal search, wherein whether the snapshot is valid for the first node is determined based further on the resolved ancestry of each of the plurality of historical CPOIs.

12. The method of claim 11, wherein each of the plurality of nodes further stores POI history data indicating each period of time during which the node was a POI, further comprising:
    traversing upward in the DAG from the first node until encountering a node storing POI history data indicating that it is or was previously a POI.

13. A non-transitory computer readable medium having stored thereon instructions for causing a processing circuitry to execute a process, the process comprising:
   accessing a first node of a plurality of nodes in a DAG to obtain first change time data and ancestry data, wherein the plurality of nodes includes at least one point of interest (POI), wherein each POI is one of the plurality of nodes storing data indicating that the node is a POI, wherein the first node stores closest POI (CPOI) data indicating a CPOI for the first node, wherein the CPOI for the first node is one of the at least one POI that requires the fewest visits when traversing upward in the DAG beginning with the first node, wherein the first change time data indicates a time of a first change to ancestry of the CPOI;
   accessing a second node of the plurality of storage nodes to obtain second change time data, wherein the second node is the CPOI for the first node indicated in the CPOI data, wherein the second change time data indicates a time of a second change to ancestry of the CPOI, wherein the second change is a most recent change to ancestry of the CPOI;
   comparing the first change time data with the second change time data; and
   determining ancestry of the first node, wherein the ancestry of the first node is determined based on the ancestry data when the first change time data matches the second change time data.

14. A system for determining ancestry in directed acyclic graphs (DAGs), comprising:
   a processing circuitry; and
   a memory, the memory containing instructions that, when executed by the processing circuitry, configure the system to:
   access a first node of a plurality of nodes in a DAG to obtain first change time data and ancestry data, wherein the plurality of nodes includes at least one point of interest (POI), wherein each POI is one of the plurality of nodes storing data indicating that the node is a POI, wherein the first node stores closest POI (CPOI) data indicating a CPOI for the first node, wherein the CPOI for the first node is one of the at least one POI that requires the fewest visits when traversing upward in the DAG beginning with the first node, wherein the first change time data indicates a time of a first change to ancestry of the CPOI;
   access a second node of the plurality of storage nodes to obtain second change time data, wherein the second node is the CPOI for the first node indicated in the CPOI data, wherein the second change time data indicates a time of a second change to ancestry of the CPOI, wherein the second change is a most recent change to ancestry of the CPOI;
   compare the first change time data with the second change time data; and
   determine ancestry of the first node, wherein the ancestry of the first node is determined based on the ancestry data when the first change time data matches the second change time data.

15. The system of claim 14, wherein the system is further configured to:
   traverse at least a portion of the DAG when the first change time data does not match the second change time data, wherein the ancestry of the first node is determined based on the traversal when the first ancestry data does not match at least a portion of the second ancestry data.

16. The system of claim 15, wherein the traversal of the at least a portion of the DAG begins at the first node and ends at a third node of the plurality of nodes, wherein the third node is a point of interest.

17. The system of claim 16, wherein the third node is the first POI visited during the traversal of the at least a portion of the DAG, wherein the system is further configured to:
   update the CPOI data stored in the first node to indicate that the third node is the CPOI.

18. The system of claim 14, wherein the second node is accessed without traversing the DAG.

19. The system of claim 14, wherein the plurality of nodes includes a fourth node, wherein the system is further configured to:
   create the first node as a new node in the DAG such that the fourth node is a parent of the first node, wherein the ancestry data in the first node is copied from the fourth node.

20. The system of claim 14, wherein the first node and the second node are included in a sub-hierarchy of the DAG, wherein the system is further configured to:
   designate a fifth node among the sub-hierarchy as a new point of interest, wherein the ancestry of the first node is determined when the fifth node has been designated as a new point of interest.

21. The system of claim 14, wherein the plurality of nodes includes a sixth node, wherein the first node is a leaf node, wherein the system is further configured to:
   move the first node within the DAG such that the sixth node is a parent of the first node, wherein the ancestry data in the first node is copied from the sixth node.

22. The system of claim 14, wherein the first node is not included in a sub-hierarchy of the DAG, wherein the system is further configured to:
   move the sub-hierarchy, wherein the ancestry of the first node is determined when the sub-hierarchy has been moved.

23. The system of claim 14, wherein each of the plurality of nodes stores historical CPOI data indicating a plurality of historical CPOIs of the node and a join time for each first historical CPOI, wherein the plurality of historical CPOIs includes a most recent CPOI for the first node, wherein the system is further configured to:
   determine, based on the historical CPOI data stored in the first node, whether a snapshot is valid for the first node.

24. The system of claim 23, wherein the system is further configured to:
   resolving an ancestry of each of the plurality of CPOIs by executing a reverse depth-first traversal search, wherein whether the snapshot is valid for the first node is determined based further on the resolved ancestry of each of the plurality of historical CPOIs.

25. The system of claim 24, wherein each of the plurality of nodes further stores POI history data indicating each period of time during which the node was a POI, wherein the system is further configured to:
   traverse upward in the DAG from the first node until encountering a node storing POI history data indicating that it is or was previously a POI.

* * * * *